LeROY F. CARKHUFF
INVENTOR

BY Karl W. Flocks

ATTORNEY

Aug. 9, 1960 LE ROY F. CARKHUFF 2,948,564
EXPANDING EGG LIFTER
Filed Sept. 4, 1959 5 Sheets-Sheet 5
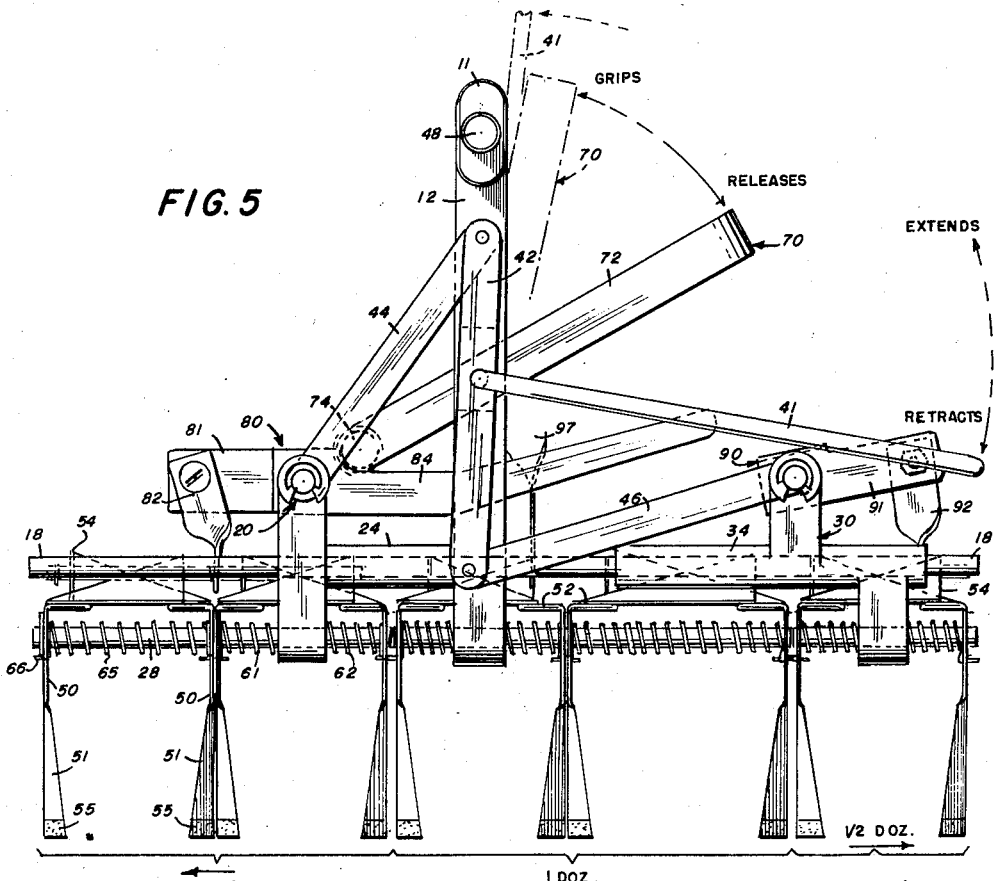
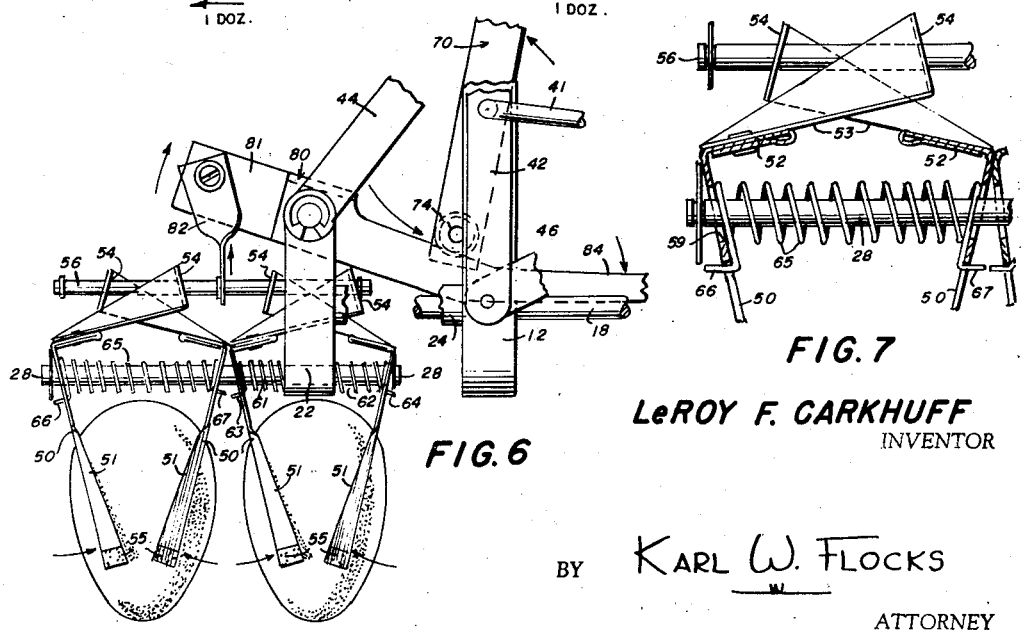
LeROY F. CARKHUFF
INVENTOR
BY Karl W. Flocks
ATTORNEY

United States Patent Office 2,948,564
Patented Aug. 9, 1960

2,948,564

EXPANDING EGG LIFTER

Le Roy F. Carkhuff, Morris, Ill., assignor to Diamond National Corporation, a corporation of Delaware Filed Sept. 4, 1959, Ser. No. 838,287

15 Claims. (Cl. 294—87)

The present invention relates to an egg lifter, and more particularly to a device for gripping eggs when they are positioned in one pattern and for varying the pattern of the eggs and then releasing the eggs in the new pattern.

Eggs are customarily packed in egg cases by the egg producer, such as an egg farmer, and are delivered in these cases to an egg room. The eggs are removed from the egg cases in the egg room and are repackaged in egg cartons. More particularly, the egg cases in which the eggs are delivered to the egg rooms have two sections, each of which has space for a plurality of layers of eggs. Each layer comprises, conventionally, either thirty or thirty-six eggs, there being five or six rows with each row containing six eggs.

While in some egg rooms intermediate handling and/or inspecting of the eggs arriving from the egg producer was conventional, in other egg rooms it is only necessary to transfer the eggs from the egg cases to the egg cartons, the egg cartons holding one dozen eggs each, in two rows of six eggs each.

There are known to the prior art various configurations of egg lifters which remove a layer at a time from the egg case and deposit these eggs at a suitable place, such as on a conveyor or on a table. In the copending application of Le Roy F. Carkhuff for "Egg Transfer Lifter," filed November 25, 1958 and bearing Serial No. 776,383, there is disclosed such an egg lifter.

Whatever advantages and disadvantages were inherent in the known egg lifter constructions, none of them were able to pick up eggs in one pattern and deposit them in another pattern, and so none of the prior art egg lifters could suitably be employed in an egg room in which it was desired to transfer eggs directly from the egg cases to the one-dozen cartons. This was because the cells of the egg cartons cannot be arranged in the same pattern as they are arranged in the sections of the egg cases. For example, one widely used type of egg carton for holding a dozen eggs is made of molded pulp and has a cellular bottom section and a cover section hinged to it, and it is necessary to provide for rapid and automatic filling and closing of these cartons. To facilitate this, they are arranged so that a cover section and a bottom section of one carton are placed serially, relative to the line of motion, and the next carton is similarly positioned behind the first carton, and so on. This arrangement of the cartons provides two rows of six cells each spaced closely adjacent each other, and a second two rows spaced from the first two rows, and so forth.

In those lifting devices known in the prior art which are capable of changing the pattern of the objects lifted, none were created for the purpose of lifting eggs; hence, none provided a suitable gripping and releasing mechanism for the eggs.

In one known lifting device, uniform spread was obtained from a closed square to an open square pattern. In this device, force was applied to peripheral members to expand and contract the device, and separate linkage was relied upon to secure the desired lateral and longitudinal spacing of the various gripping members forming a part of the device. The mechanism for gripping and releasing was only generally indicated, and this device was highly complex and costly. Further, it failed to teach how its stated objectives could be obtained.

In other devices, the grip and release action was imparted individually to each of the multiple clamping devices, and so such devices offered no satisfactory solution where thirty or thirty-six items were to be handled swiftly and gently.

In still other devices, there were provided rollers which were fixed to the surrounding framework of the machine, which rollers engaged trip levers on the lifting device to control the grip and release mechanism. As will be understood, such an arrangement is inflexible and therefore not suitable for use in a modern egg room.

An object of the present invention is to provide an egg lifter that will grip eggs or the like in one pattern and release them in another pattern.

Another object of the present invention is the provision of a variable pattern egg lifter or the like that is entirely self-contained.

Yet another object of the present invention is to provide an egg lifter that will grip and release eggs or the like in different patterns, and in which the gripping control mechanism and pattern control mechanism are component parts of the lifter.

A further object of the present invention is the provision of a variable pattern egg lifter or the like that is relatively light, and which may be lifted by hand, even when loaded.

A still further object of the present invention is to provide a variable pattern egg lifter that is economical to manufacture.

Yet another object of the present invention is the provision of a variable pattern egg lifter that does not require an external connection to a source of power.

Other objects and the nature and advantages of the instant invention will be apparent from the following description taken in conjunction with the accompanying drawings, wherein:

Fig. 5 is a side elevation of the egg lifter of Fig. 1, when in the contracted position.

Fig. 6 is an enlarged detailed view showing the operation of the grip and release operating mechanism.

Fig. 7 is an enlarged cross-sectional view taken on line 7—7 of Fig. 4, and showing parts in the egg gripping position.

Figure 1:
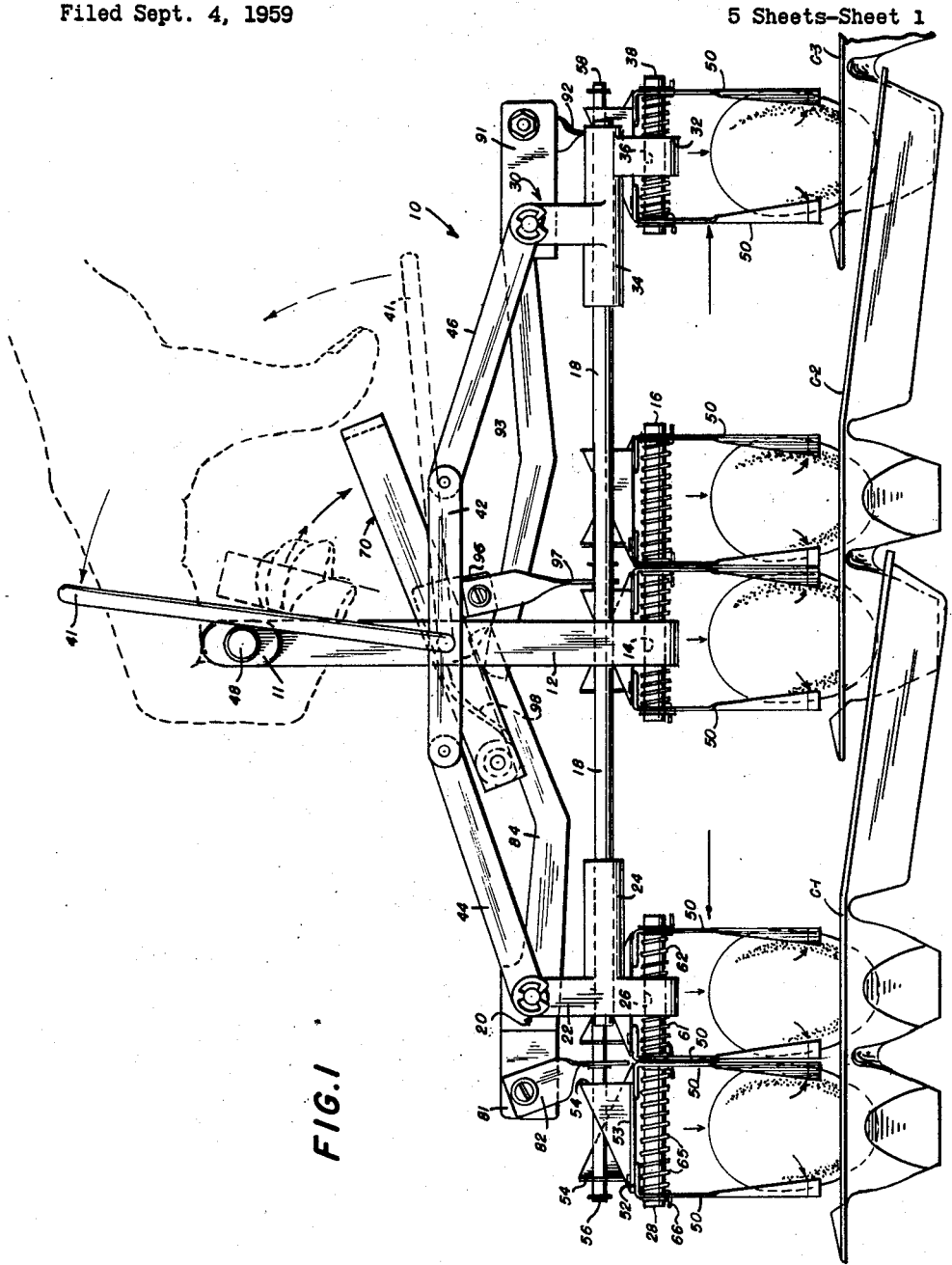
Fig. 1 is a side elevation of an egg lifter in accordance with the present invention in its expanded position.

Referring now to the drawings, wherein like reference characters are used to designate like or corresponding parts throughout the several views, there is shown an egg lifter 10 that is capable of lifting thirty eggs which are arranged in five rows of six eggs each, it being understood that the eggs are closely spaced within each row and that the rows are closely spaced. The egg lifter 10 has fingers for lifting each of the eggs, and has mechanism for moving these fingers from release position to gripping position. After the eggs have been gripped, the egg lifter 10 has a mechanism for expanding it, so that, in the present embodiment, three groups of eggs are provided, the groups being separated from each other. After separation of the groups, the gripping finger control mechanism is operated to release the eggs.

Figure 2:
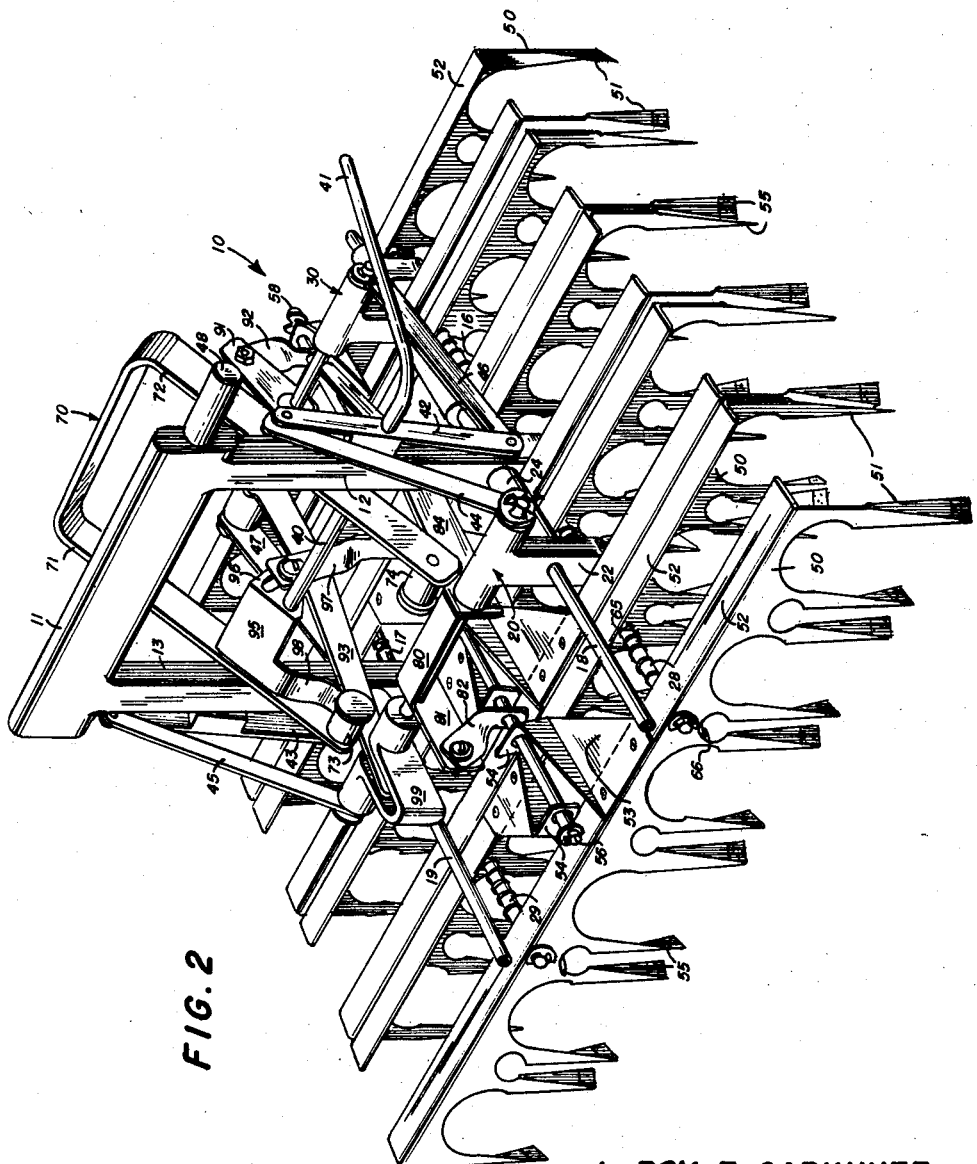
Fig. 2 is a perspective view of the egg lifter of Fig. 1.

Referring now to Figs. 1 and 2, the egg lifter 10 is provided with a central handle 11. Handle 11 is of inverted U-shape, and has spaced depending legs 12 and 13. An aperture 14 may be seen at the lower part of leg 12 in Fig. 1, aperture 14 extending through leg 12 and having its axis perpendicular to the plane of handle 11. A parallel hole is provided at the lower end of leg 13.

A support rod 16 may be seen in Fig. 1 extending through the aperture 14, and a similar support rod 17 may be seen extending through the lower part of leg 13 in Fig. 2. The support rods 16 and 17 serve to support a middle group of egg gripping fingers, as will be hereinbelow described.

Above the support rods 16 and 17, the legs 12 and 13 are provided with a pair of parallel guide bars 18 and 19. Guide bars 18 and 19 may have, as shown, circular cross-sections, and they extend through the legs 12 and 13 so that they emerge on either side thereof. The bars 18 and 19 are generally parallel to the support rods 16 and 17 in the embodiment shown.

To the left of handle 11, there may be seen in Figs. 1 and 2 a support bracket 20 that is of inverted, generally U-shape, bracket 20 having a pair of depending legs 21 and 22. Bracket 20 is generally parallel to handle 11, and has sleeves 23 and 24 extending therefrom towards handle 11, this construction being shown in Fig. 4. Sleeves 23 and 24 have holes therethrough which slidingly receive the guide bars 19 and 18, respectively.

Depending supporting legs 21 and 22 of bracket 20 are apertured in similar fashion to the legs 12 and 13 of handle 11. Thus, there may be seen in Fig. 1 an aperture 26 extending through the lower end of leg 22, aperture 26 having a support rod 28 extending therethrough. A companion support rod 29 may be seen in Fig. 2, support rod 29 extending through a similar aperture in leg 21. A bracket 30, similar to bracket 20, may be seen to the right of handle 11 in Figs. 1 and 2, bracket 30 having a pair of depending support legs, support leg 32 thereof being shown in Fig. 1, and being somewhat offset. Bracket 30 also has sleeves 33 and 34 (see Fig. 4) which extend therefrom towards handle 11 and which have holes therein that slidingly receive the guide bars 19 and 18, respectively. The depending legs of bracket 30 are apertured similarly to the apertured legs of bracket 20, there being shown in Fig. 1 the aperture 36 through which extends a support rod 38. A similar support rod (not shown) extends through the aperture in the corresponding depending leg of bracket 30.

Figure 3:
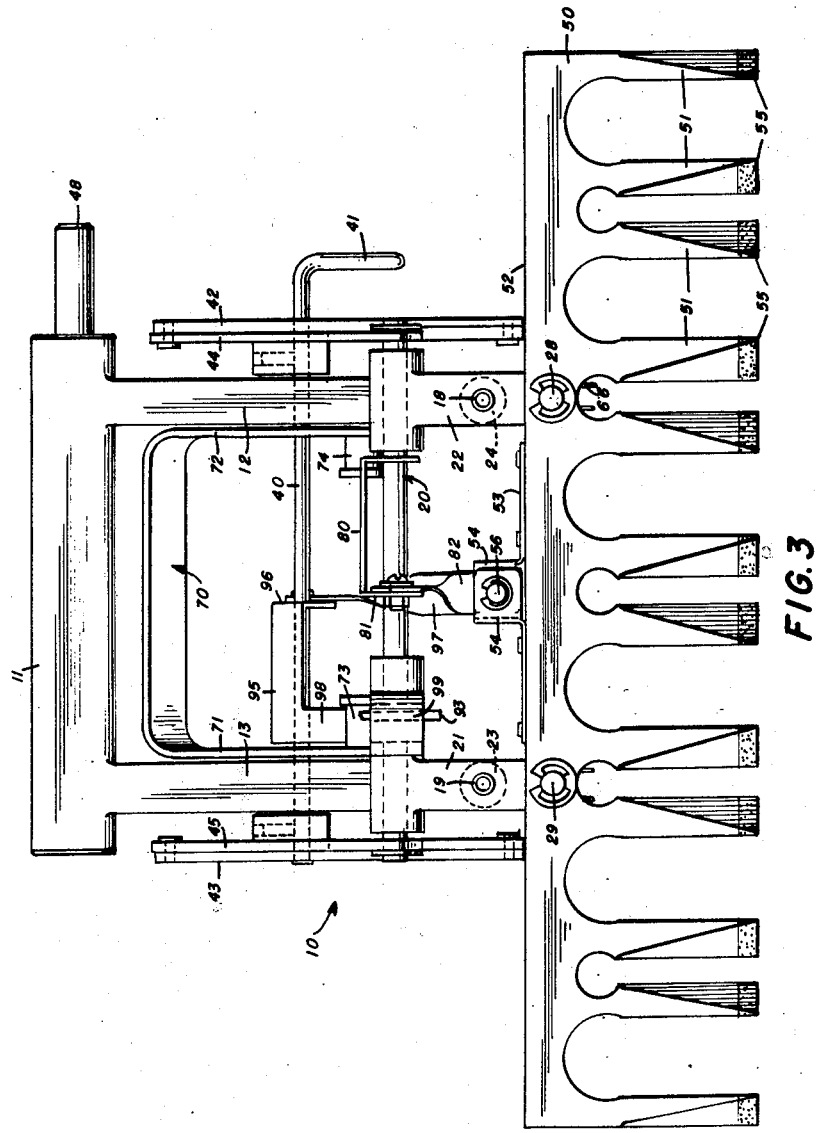
Fig. 3 is an end elevation of the egg lifter of Fig. 1.

A pattern control shaft 40 may be seen in Figs. 2 and 3 extending between and pivotally supported by the legs 12 and 13 of handle 11. Pattern control shaft 40 is angled at one end to provide the pattern control arm 41. Fixed to pattern control shaft 40 outwardly of each handle leg 12, 13 are similar, parallel pattern control levers 42, 43. To the upper end of lever 42, as shown in Fig. 2, there is pivotally connected a link 44, a similar link 45 being similarly pivotally connected to the upper end of lever 43. The other ends of links 44 and 45 are pivotally connected to the bracket 20.

To the lower end of lever 42 there is pivotally connected one end of a link 46, a similar link 47 (see Fig. 4) being connected to the lower end of lever 43. The other ends of links 46 and 47 are connected to the bracket 30.

As a consequence of the rotation of pattern control shaft 40 by movement of the arm 41, the pattern control levers 42 and 43 may be rotated from the position shown in Figs. 2 and 5 to the position shown in Fig. 1, and vice versa, and this movement of the levers 42 and 43 will cause the brackets 20 and 30 to move between the position shown in Figs. 2 and 5 and the position shown in Fig. 1; the former position is the contracted position of the egg lifter 10 and the latter position is the expanded position of egg lifter 10. The brackets 20 and 30 slide on the guide bars 18 and 19, and the outward or expanded position thereof is determined by the engagement of arm 41 with a stop member 48 that extends from handle 11.

Each of handle 11 and brackets 20 and 30 carries at least one group of egg-engaging fingers, and in the embodiment illustrated, handle 11 and bracket 20 each carry two groups of egg-engaging fingers and bracket 30 carries one such group. As will be understood, the number of groups carried by handle 11 and brackets 20 and 30 may be varied, and it is particularly contemplated that the bracket 30 may be so configured as to carry two groups of egg-engaging fingers in order that an egg lifter may be provided for thirty-six eggs.

Preferably, the egg-engaging fingers of the present egg lifter and the attendant control mechanism for these fingers, in certain respects, are the same as in the above-referenced application.

As is best seen in Figs. 2 and 3, there are provided a plurality of finger blades 50. Each of the blades 50 has six pairs of egg-engaging fingers 51 depending therefrom. The fingers 51 of each pair are twisted in opposite directions, and the lower ends thereof lie in planes that are substantially tangent to a circle. This circle is one of the circles of an egg when considered in transverse cross-section, and the center of the circle of the egg lies between two blades 50 forming a pair of such blades. The fingers 51 of a pair of blades 50 cooperate to grasp or grip a row of eggs, the pairing of the blades 50 being clearly shown in Fig. 1.

Each of the fingers 51 is of spring steel and has a friction coating 55 at the lower end thereof.

In Fig. 1, it may be seen that each of the blades 50 has a flange 52 at the top thereof, and that the flanges 52 of a pair of finger blades 50 extend toward each other. Hence, each flange 52 extends toward the other blade 50 of a pair of blades. To each flange 52 there is secured, by rivets or the like, an arm 53 that extends towards the other blade 50 of a pair of blades. The arm 53 (see also Fig. 2) has an upstanding, apertured lug 54. The apertures of the lug 54 are aligned, and blade actuating rods extend through the apertures of the lugs 54 of each group of blades 50.

Figure 4:
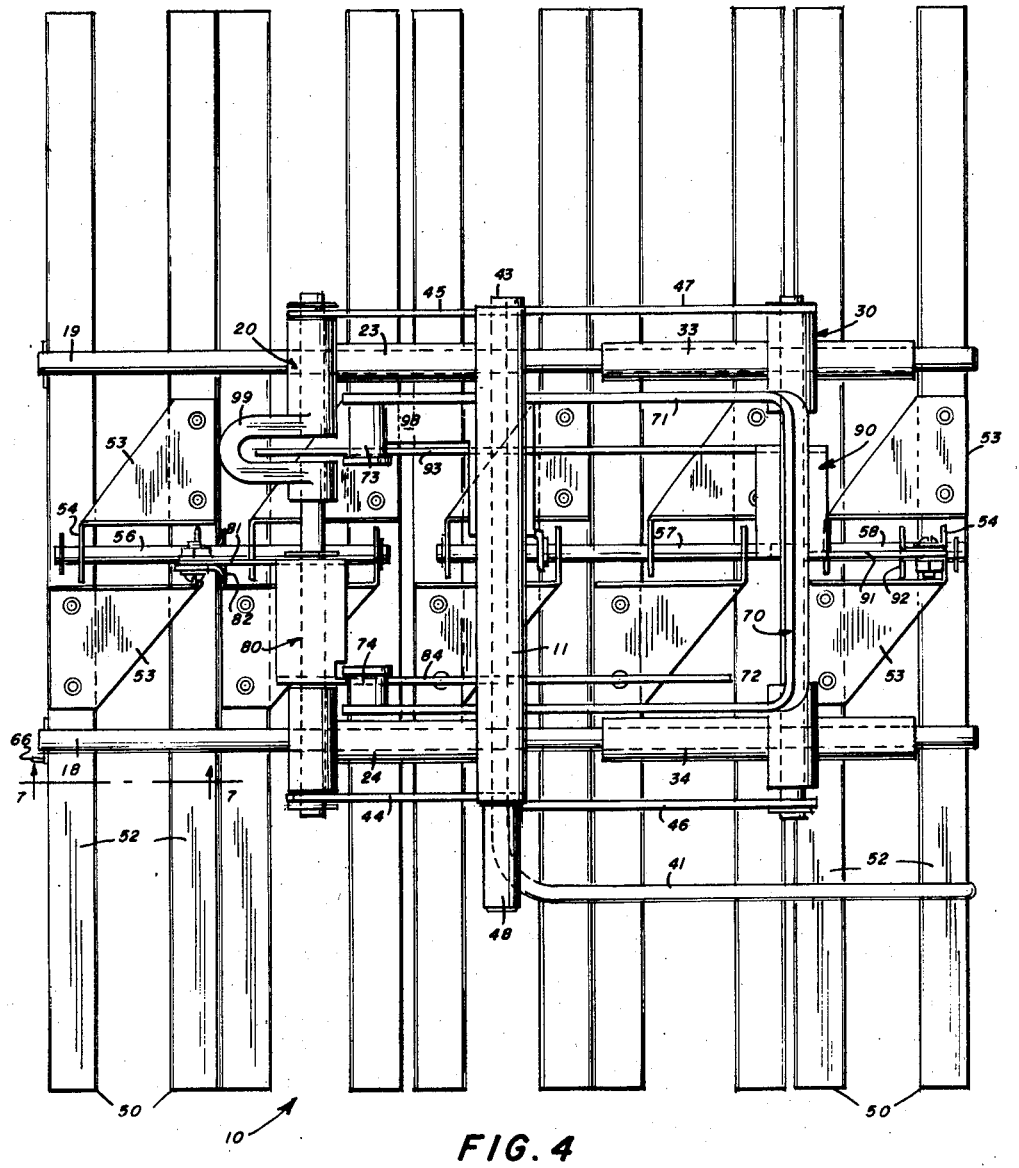
Fig. 4 is a plan view of the egg lifter of Fig. 1.

Thus, referring to Fig. 4, there are provided three blade actuating rods; a first blade actuating rod 56 extends through the four apertured lugs 54 that are attached to the four blades 50 forming the group of blades carried by the bracket 20. A second blade actuating rod 57 may be seen in axial alignment with blade actuating rod 56, the rod 57 extending through the four apertured lugs 54 of the four blades 50 carried by handle 11. A third blade actuating rod 58 extends through the apertured lugs 54 of the two blades 50 that are carried by the bracket 30.

Each of the blade actuating rods 56, 57 and 58 is provided at its ends with suitable keepers, and the actuating rods are of a smaller diameter than the apertures in the lugs 54, thus to provide a loose or sloppy fit therewith.

The blades 50 each has a pair of spaced holes 59 therein (see Fig. 7) and through these holes pass, with a loose fit because of their smaller diameter, the several support rods 16, 17, 28, 29, 38 which are carried by the lower ends of the legs of the handle 11 and brackets 20 and 30. Hence, each group of the blades 50 is carried by two spaced parallel support rods and the two support rods are in turn carried by one of the handle 11, bracket 20 or bracket 30.

The supporting of the groups of blades 50 on the support rods is clearly shown in Fig. 1, where it may also be seen that the legs of each of the handle 11 and brackets 20 and 30 extend between a pair of blades 50 of each of the group of blades. In addition, there is shown in Fig. 1 a pair of springs 61 and 62 encircling the support rod 28 and each extending between one face of leg 22 and the adjacent blade 50. The coil springs 61 and 62 have ends 63 and 64, respectively, which abut against the blades 50 and extend through suitable holes in these blades. These springs 61 and 62, therefore, yieldingly resist the movement of the blades into egg-gripping position and yieldingly urge the blades 50 into release position.

A spring 65 may be seen in Figs. 6 and 7 to extend between the two blades 50 of the first or left-hand group of blades, the ends 66 and 67 similarly abutting and extending through the blades 50 of this first group; the function of spring 65 is the same as that of springs 61 and 62.

To effect the gripping and releasing of eggs by the blades 50, there is provided an inverted U-shaped bail 70 having spaced legs 71 and 72, as may be seen in Fig. 2, the legs 71 and 72 being pivotally supported intermediate their ends on the shaft 40. The lower end of leg 71 rotatably supports a roller 73, and a similar roller 74 is similarly rotatably carried by the lower end of leg 72.

A blade actuating lever 80 is pivotally supported on the bracket 20, and has a first arm 81 extending from bracket 20 away from handle 11. Pivotally connected to and depending from the first arm 81 of blade actuating lever 80 is a connecting link 82. A second arm 83 of lever 80 extends from bracket 20 through the legs 12 and 13 of handle 11, and as may be seen in Fig. 4, underlies roller 74.

A similar blade actuating lever 90 is pivotally supported on the bracket 30 (see Fig. 4) the lever 90 having a first arm 91 extending away from handle 11, the arm 91 having a depending connecting link 92 pivotally connected to the end thereof. The second arm 93 of lever 90 underlies the roller 73 on leg 71.

A plate 95 may be seen in Figs. 2 and 3 adjacent leg 71 of bail 70. Plate 95 has an angled part 96 to which is pivotally connected a connecting link 97. Plate 95 also has a contoured arm 98 that extends towards roller 73, arm 98 serving as a deflector for the end of arm 93 of blade actuating lever 90.

As the arm 93 is long, to avoid interference with bracket 20 when the lifter 10 is in the contracted position, the bracket 20 has a U-bend 99 therein.

Each of the connecting links 82, 92 and 97 has an aperture in its lower end, these apertures loosely receiving the several blade actuating rods. Thus, connecting link 82 has an aperture that loosely receives blade actuating rod 56 of the group of blades carried by the bracket 20. Connecting link 92 has the blade actuating rod 58 extending through the aperture thereof, blade actuating rod 58 being associated with the blades 50 of the group of blades carried by the bracket 30. The connecting link 97, which is secured to bail 70 by plate 95 above shaft 40, has the blade actuating rod 57 of the group of blades 50 carried by handle 11 in the aperture thereof.

To use egg lifter 10, it is placed in the contracted position shown in Figs. 2, 4 and 5, with the blades 50 in egg-release position, as shown in these figures. The egg lifter 10 is then placed over and in registry with the eggs lying on a filler flat in an egg case, there being thirty such eggs arranged in five rows of six eggs each. The bail 70 is then rotated, referring to Fig. 5, so that the bight thereof moves to the dotted line position. As the bail 70 is thus caused to rotate, the rollers 73 and 74 thereof will engage the second arms 93 and 84, respectively, of the blade actuating levers 90 and 80, respectively. Blade actuating lever 80 will thereby rotate in a clockwise manner on bracket 20 and the arm 81 thereof will be raised. Similarly, blade actuating lever 90 will be rotated in a counter-clockwise direction and arm 91 thereof will be raised. The arms 81 and 91 will cause the connecting links 82 and 92 to move upwardly, as well as connecting link 97, and as a consequence all three of the blade actuating rods 56, 57 and 58 will be caused to move upwardly.

Referring now to Figs. 6 and 7, upward movement of connecting link 82, for example, will cause the blade actuating rod 56 to raise the lugs 54 of the two groups of blades 50 that are supported by the support rods 28 and 29 carried by bracket 20. Because of the loose fit of the blades 50 on the support rods 28, 29, they will rotate, the fingers 51 of a pair of blades 50 moving towards each other to egg-engaging position, which is shown in Fig. 6.

The inward swinging movement of the blades 50 to the egg-engaging position serves to compress the ends of the various springs about support rod 28, and as is clearly shown in Fig. 7, the ends 66 and 67 of spring 65 resist this movement, being compressed thereby. Thus, spring 65 tends to rotate the blades 50 from the position shown in Fig. 7 to that shown in Fig. 5, and this action of the spring 65 tends to urge the bail 70 from the dotted line position shown in Fig. 5 back to the full line position. While each of the springs 61, 62 and 65 shown in Figs. 6 and 7 is relatively weak, it will be understood that such springs are provided on each of the support rods 16, 17, 28, 29, 38, for example. Together, these spring forces act through the blades 50, lugs 54, blade actuating rods 56, 57, 58, connecting links 82, 92, 97, blade actuating levers 80 and 90 and bail 70 to exert a reasonable force to return bail 70 to the egg release position shown in full lines in Fig. 5.

With the bail 70 in the dotted line egg-gripping position shown in Fig. 5, the thirty eggs may be lifted from the filler flat and the egg lifter 10 with the eggs therein moved over a conveyor (not shown) on which are positioned egg cartons of the type shown in Fig. 1. With bail 70 still held in the egg gripping position, arm 41 may be rotated upwardly from the position shown in Fig. 5 to the position shown in Fig. 1, in which it abuts the stop member 48. During this rotation of arm 41, the pattern control levers 42 and 43 are rotated from the approximately vertical position thereof shown in Fig. 5 to the approximately horizontal position shown in Fig. 1, and as a consequence the brackets 20 and 30 are caused, by the links 44, 45 and 46, 47 respectively, to move outwardly away from the handle 11 to the expanded position shown in Fig. 1, the brackets 20 and 30 sliding on the guide bars 18 and 19 during this movement.

When this movement has been accomplished, a first group, comprising one-dozen eggs, will be positioned over the egg cells of a first carton C–1, this first group being supported by the bracket 20. A carton C–2 will have the cell or bottom section thereof straddling a flange of the cover of carton C–1, and a second group of one-dozen eggs, carried by the handle 11, will be above the cells of the carton C–2. The third group of eggs, carried by the bracket 30 will be above one row of cells in an egg carton C–3 that is positioned with respect to carton C–2 in the same manner as carton C–2 is positioned with respect to carton C–1.

It will be understood that the several groups of blades are held in the egg-gripping position while the lifter 10 is in the expanded position shown in Fig. 1. This is so because the bail 70 is still held in its position adjacent the handle 11 with the rollers 73 and 74 thereof in their most downward position. Hence, these rollers are substantially at the position shown in Fig. 6 and engage with the tops of the arms 93 and 84 as these arms translate away from the handle 11, carried by the brackets 20 and 30. Since the arms 84 and 93 are elongated, as shown, the rollers 73 and 74 will continue to hold the blade actuating levers 80 and 90 in their rotated positions, as is indicated by the position of lever 80 in Fig. 6.

To release the eggs, therefore, it is only necessary for the operator to release his thumb, and the springs 61, 62, 65 etc. will rotate the blades 50 to the egg-releasing position shown in Fig. 1.

The arm 41 may then be rotated so as to return the egg lifter 10 to the contracted position, shown in Figs. 2 and 5, and the lifter 10 will then be ready to repeat the operations.

There has been provided an egg lifter that is economical in construction and which requires no external source of power, that is able to pick up eggs or similar articles in one pattern and to then change the pattern of the eggs or articles thus lifted and then release them. The egg lifter herein provided is entirely self-contained, having thereon all of the mechanism for expanding and contracting the lifter to establish its different patterns and for gripping and releasing articles.

It will be obvious to those skilled in the art that various changes may be made without departing from the spirit of the invention and therefore the invention is not limited to what is shown in the drawings and described in the specification but only as indicated in the appended claims.

What is claimed is:

1. An expanding egg lifter comprising three parallel groups of finger blades, each group of blades comprising at least one pair of blades with the blades of each pair being in spaced generally parallel relationship, each blade having a plurality of pairs of egg-engaging spring fingers depending therefrom, the fingers of each pair being twisted in opposite directions and lying in planes substantially tangent to a circle having its center between the blades of a pair of blades, a friction material on said fingers, a flange at the top of each blade extending towards the other blade of the pair, an arm secured to the flange of each blade, each arm extending toward the other blade of a pair of blades and having an upstanding apertured lug, said lug apertures being aligned, a blade actuating rod extending loosely through said lug apertures, an inverted U-shaped handle having spaced, depending apertured supporting legs, a pair of parallel guide bars each extending through a leg of said handle, said bars being transverse to the plane of said handle, a pair of inverted generally U-shaped brackets parallel to and on opposite sides of said handle, said brackets having holes slidingly receiving said guide bars and having spaced depending apertured supporting legs, the legs of one bracket extending between a pair of blades of one end group of blades, the legs of the other bracket extending between a pair of blades of the other end group of blades, and the legs of the handle extending between a pair of blades of the middle group of blades, each blade having a pair of spaced holes therein, a support rod extending through the aperture of each leg and loosely through a hole in each finger blade of the group with which its supporting leg is associated, a pattern control shaft pivotally supported above said blades by said handle legs and extending therethrough, a pattern control lever outwardly of each handle leg, each said lever being connected at a midpoint thereof to said shaft, a first pair of links each having one end pivotally connected to an end of each lever and each having the other end pivotally connected to one of said brackets, a second pair of links each having one end pivotally connected to the other end of each lever and each having the other end pivotally connected to the other of said brackets, an inverted U-shaped bail having spaced legs pivotally supported by said shaft intermediate their ends, said bail having a roller carried by the lower end of each leg thereof, a bade actuating lever pivotally supported on each of said brackets and each comprising a first arm having a depending connecting link pivotally connected thereto and a second camming arm underlying one of said rollers whereby upon pivoting of said bail said blade actuating levers will be pivoted on said brackets, a third connecting link pivotally connected to and depending from said bail between the bight thereof and said shaft, each said connecting link having an aperture in its lower end receiving the blade actuating rod of one of said groups of blades.

2. The egg lifter according to claim 1, and further including spring means for opposing movement of said blades by blade actuating rods.

3. An expanding egg lifter comprising three parallel groups of finger blades, each group of blades comprising at least one pair of blades with the blades of each pair being in spaced generally parallel relationship, each blade having a purality of pairs of egg-engaging spring fingers depending therefrom, an upstanding apertured lug connected to each blade, each lug being laterally offset relative to the general plane of its blade and extending toward the other blade of its pair, said lug apertures being aligned, a blade actuating rod extending loosely through said lug apertures, an inverted U-shaped handle having spaced, depending apertured supporting legs, a pair of parallel guide bars each extending through a leg of said handle, said bars being transverse to the plane of said handle, a pair of inverted generally U-shaped brackets parallel to and on opposite sides of said handle, said brackets having holes slidingly receiving said guide bars and having spaced depending apertured supporting legs, the legs of one bracket extending between a pair of blades of one end group of blades, the legs of the other bracket extending between a pair of blades of the other end group of blades, and the legs of the handle extending between a pair of blades of the middle group of blades, each blade having a pair of spaced holes therein, a support rod extending through the aperture of each leg and loosely through a hole in each finger blade of the group with which its supporting leg is associated, a pattern control shaft pivotally supported above said blades by said handle legs and extending therethrough, a pattern control lever outwardly of each handle leg, each said lever being connected at a midpoint thereof to said shaft, a first pair of links each having one end pivotally connected to an end of each lever and each having the other end pivotally connected to one of said brackets, a second pair of links each having one end pivotally connected to the other end of each lever and each having the other end pivotally connected to the other of said brackets, an inverted U-shaped bail having spaced legs pivotally supported by said shaft intermediate their ends, said bail having a roller carried by the lower end of each leg thereof, a blade actuating lever pivotally supported on each of said brackets and each comprising a first arm having a depending connecting link pivotally connected thereto and a second camming arm underlying one of said rollers whereby upon pivoting of said bail said blade actuating levers will be pivoted on said brackets, a third connecting link pivotally connected to and depending from said bail between the bight thereof and said shaft, each said connecting link having an aperture in its lower end receiving the blade actuating rod of one of said groups of blades.

4. An expanding egg lifter comprising three parallel groups of finger blades, each group of blades comprising at least one pair of blades with the blades of each pair being in spaced generally parallel relationship, each blade having a plurality of pairs of egg-engaging spring fingers depending therefrom, an upstanding apertured lug connected to each blade, each lug being laterally offset relative to the general plane of its blade and extending toward the other blade of its pair, said lug apertures being aligned, a blade actuating rod extending loosely through said lug apertures, an inverted U-shaped handle having spaced, depending apertured supporting legs, a pair of parallel guide bars each extending through a leg of said handle, said bars being transverse to the plane of said handle, a pair of inverted generally U-shaped brackets parallel to and on opposite sides of said handle, said brackets having holes slidingly receiving said guide bars and having spaced depending apertured supporting legs, the legs of one bracket extending between a pair of blades of one end group of blades, the legs of the other bracket extending between a pair of blades of the other end group of blades, and the legs of the handle extending between a pair of blades of the middle group of blades, each blade having a pair of spaced holes therein, a support rod extending through the aperture of each leg and loosely through a hole in each finger blade of the group with which its supporting leg is associated, pattern control means secured to said handle, force transmitting means connected to said brackets and pattern control means for extending and contracting said brackets relative to said handle on said guide bars, an inverted U-shaped bail having spaced legs pivotally supported intermediate their ends on said handle, said bail having a roller carried by the lower end of each leg thereof, a blade actuating lever pivotally supported on each of said brackets and each comprising a first arm having a depending connecting link pivotally connected thereto and a second camming arm underlying one of said rollers whereby upon pivoting of said bail said blade actuating levers will be pivoted on said brackets, a third connecting link pivotally connected to and depending from said bail between the bight and the pivotal support thereof, each said connecting link having an aperture in its lower end receiving the blade actuating rod of one of said groups of blades.

5. An expanding egg lifter comprising three parallel groups of finger blades, each group of blades comprising at least one pair of blades with the blades of each pair being in spaced generally parallel relationship, each blade having a plurality of pairs of egg-engaging spring fingers depending therefrom, an upstanding apertured lug connected to each blade, each lug being laterally offset relative to the general plane of its blade and extending toward the other blade of its pair, said lug apertures being aligned, a blade actuating rod extending loosely through said lug apertures, an inverted U-shaped handle having spaced, depending apertured supporting legs, a pair of parallel guide bars each extending through a leg of said handle, said bars being transverse to the plane of said handle, a pair of inverted generally U-shaped brackets parallel to and on opposite sides of said handle, said brackets having holes slidingly receiving said guide bars and having spaced depending apertured supporting legs, the legs of one bracket extending between a pair of blades of one end group of blades, the legs of the other bracket extending between a pair of blades of the other end group of blades, and the legs of the handle extending between a pair of blades of the middle group of blades, each blade having a pair of spaced holes therein, a support rod extending through the aperture of each leg and loosely through a hole in each finger blade of the group with which its supporting leg is associated, a pattern control shaft pivotally supported above said blades by said handle legs and extending therethrough, a pattern control lever outwardly of each handle leg, each said lever being connected at a midpoint thereof to said shaft, a first pair of links each having one end pivotally connected to an end of each lever and each having the other end pivotally connected to one of said brackets, a second pair of links each having one end pivotally connected to the other end of each lever and each having the other end pivotally connected to the other of said brackets, whereby said brackets may be moved between extended and contracted positions upon movement of said levers, an inverted U-shaped bail having spaced legs pivotally supported by said shaft intermediate their ends, and force transmitting means operatively connected between said bail and blade actuating rods and operable upon rotation of said bail for raising and lowering said blade actuating rods together and for maintaining said blade actuating rods in raised position when said brackets are in extended position.

6. An expanding egg lifter comprising three parallel groups of finger blades, each group of blades comprising at least one pair of blades with the blades of each pair being in spaced generally parallel relationship, each blade having a plurality of pairs of egg-engaging spring fingers depending therefrom, an upstanding apertured lug connected to each blade, each lug being laterally offset relative to the general plane of its blade and extending toward the other blade of its pair, said lug apertures being aligned, a blade actuating rod extending loosely through said lug apertures, an inverted U-shaped handle having spaced, depending apertured supporting legs, a pair of parallel guide bars each extending through a leg of said handle, said bars being transverse to the plane of said handle, a pair of inverted generally U-shaped brackets parallel to and on opposite sides of said handle, said brackets having holes slidingly receiving said guide bars and having spaced depending apertured supporting legs, the legs of one bracket extending between a pair of blades of one end group of blades, the legs of the other bracket extending between a pair of blades of the other end group of blades, and the legs of the handle extending between a pair of blades of the middle group of blades, each blade having a pair of spaced holes therein, a support rod extending through the aperture of each leg and loosely through a hole in each finger blade of the group with which its supporting leg is associated, pattern control means secured to said handle, force transmitting means connected to said brackets and pattern control means for extending and contracting said brackets relative to said handle on said guide bars, and force transmitting means on said handle operatively connected to said blade actuating rods for raising and lowering said blade actuating rods together and for maintaining said blade actuating rods in raised position when said brackets are in extended position.

7. An expanding egg lifter comprising three parallel groups of article engaging means, actuating rod means operatively connected with the article engaging means of each group operable to cause the article engaging means to move between gripping and release positions, a handle having depending apertured supporting legs, guide means carried by said handle and extending transversely thereof, a pair of brackets parallel to and on opposite sides of said handle, said brackets having holes slidingly receiving said guide means, support means carried by said handle and said brackets for supporting at least one group of article engaging means from each said handle and brackets, respectively, pattern control means secured to said handle, force transmitting means connected to said brackets and pattern control means for extending and contracting said brackets relative to said handle on said guide means, and second force transmitting means on said handle and operatively connected to said actuating rod means for operating said actuating rod means when said brackets are either extended or contracted and for positioning said article engaging means in gripping or release position.

8. The egg lifter of claim 7, said actuating rod operating means comprising a lever pivotally supported intermediate the ends thereof on each of said brackets, and means on said handle engageable with said levers in the extended and contracted positions of said brackets.

9. The egg lifter of claim 7, said pattern control means comprising a lever pivotally mounted on said handle and links connecting said lever and said brackets.

10. An expanding egg lifter comprising at least two groups of means for engaging and releasing articles, operating means connected to said two groups of means, a handle having guide means thereon, a bracket having means slidingly receiving said guide means, support means carried by said handle and said bracket for supporting a group of said article engaging means on each said handle and bracket, pattern control means secured to said handle, force transmitting means connected to said bracket and pattern control means for extending and contracting said bracket on said guide means, and second force transmitting means on said handle and connected to said operating means for actuating said article engaging means for causing engaging or releasing of articles when said bracket is either extended or contracted relative to said handle.

11. The egg lifter of claim 10, said groups of article engaging means each comprising a pair of spaced, parallel blades having depending spring fingers.

12. The egg lifter of claim 11, said support means comprising rods, said blades including upstanding apertured lug portions offset from the plane of its blade and extending toward the other blade of its pair and loosely receiving said rods and pivotal thereon.

13. The egg lifter of claim 12, said rods having springs thereon resisting pivotal movement of said blades toward article engaging position.

14. The egg lifter of claim 10, said pattern control means comprising a lever pivotally mounted on said handle and a link connecting said lever and said bracket.

15. The egg lifter of claim 10, said article engaging means actuating means comprising at least one lever pivotally mounted intermediate the ends thereof on said bracket, and means on said handle engageable with said lever in the extended and contracted positions thereof.

References Cited in the file of this patent

UNITED STATES PATENTS

| | | |
|---|---|---|
| 1,224,373 | Goble | May 1, 1917 |
| 1,573,332 | Smythe et al. | Feb. 16, 1926 |
| 2,361,461 | Mezey | Oct. 31, 1944 |
| 2,666,665 | Whitcher | Jan. 19, 1954 |
| 2,714,523 | Bliss | Aug. 2, 1955 |